W. A. VAN BERKEL.
DEVICE FOR SHARPENING THE ROTARY CIRCULAR KNIVES OF MEAT SLICING MACHINES.
APPLICATION FILED APR. 24, 1908.

947,606.

Patented Jan. 25, 1910.

4 SHEETS—SHEET 1.

Witnesses:
P. F. Nagle
H. G. Dieterich

Inventor
By Wilhelmus Adrianus van Berkel
Diederstein & Fairbault
Attorneys.

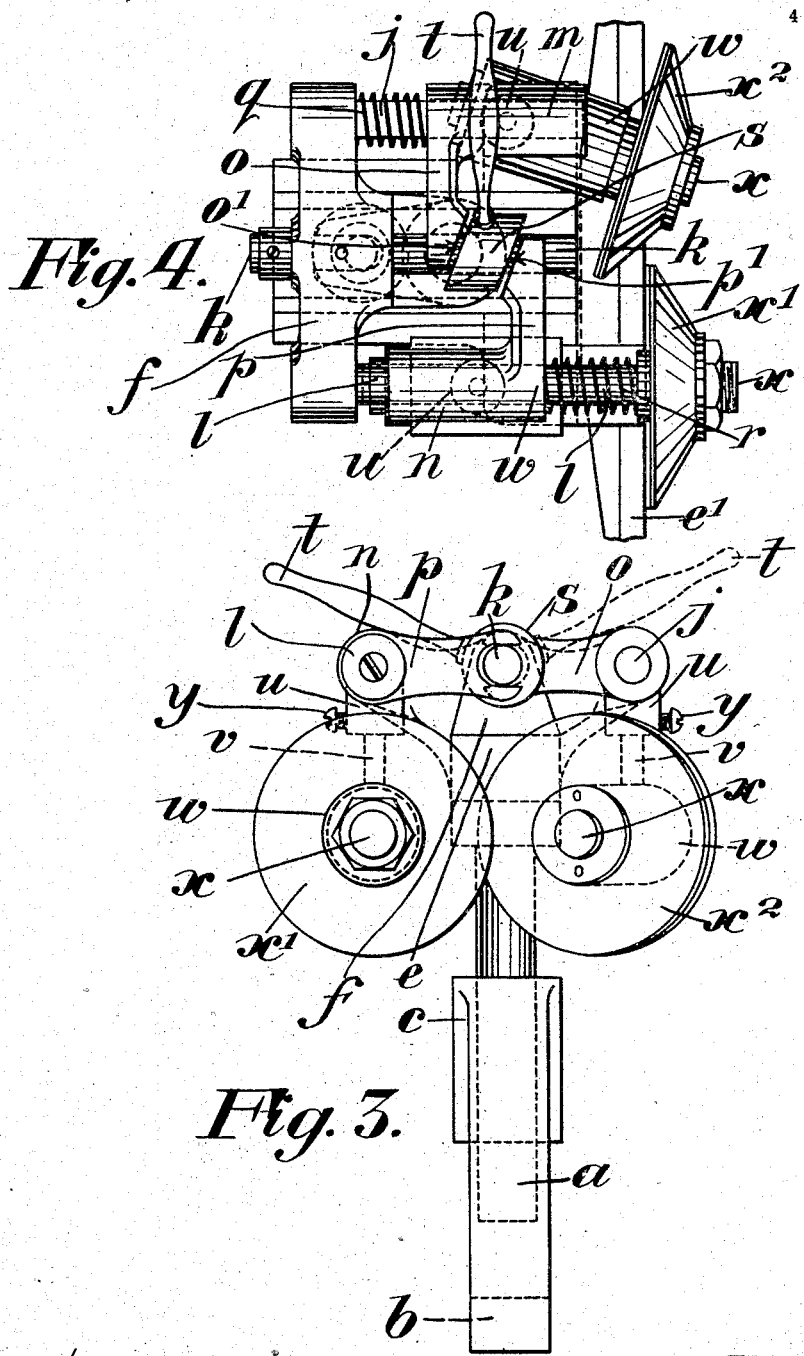

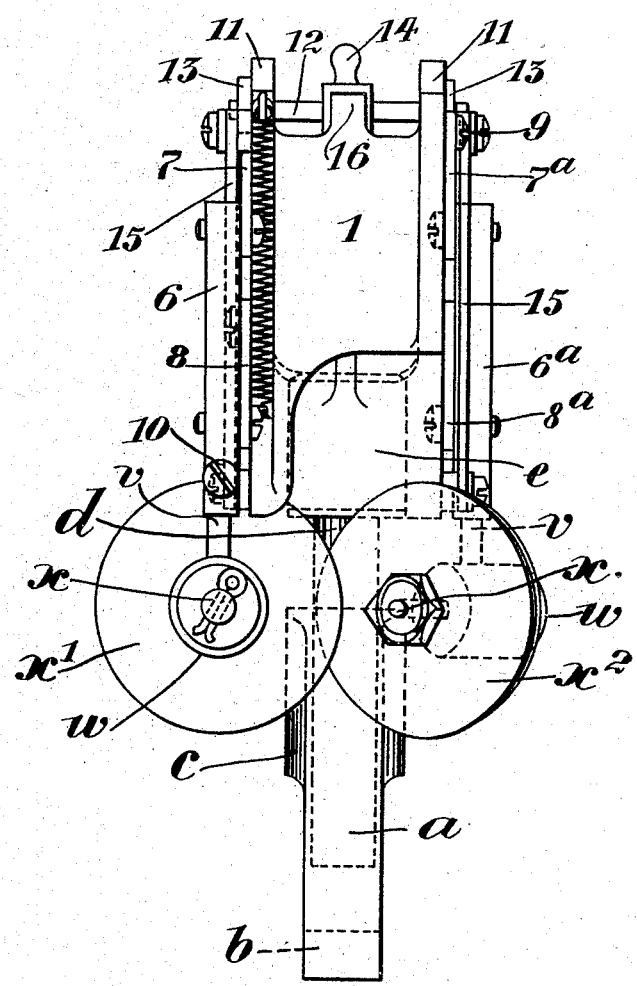

UNITED STATES PATENT OFFICE.

WILHELMUS ADRIANUS VAN BERKEL, OF ROTTERDAM, NETHERLANDS, ASSIGNOR TO VAN BERKEL'S SLICING MACHINE MANUFACTURING COMPANY, LIMITED, OF LONDON, ENGLAND, A CORPORATION OF GREAT BRITAIN.

DEVICE FOR SHARPENING THE ROTARY CIRCULAR KNIVES OF MEAT-SLICING MACHINES.

947,606.  Specification of Letters Patent.  Patented Jan. 25, 1910.

Application filed April 24, 1908. Serial No. 428,921.

*To all whom it may concern:*

Be it known that I, WILHELMUS ADRIANUS VAN BERKEL, of 54 Boezemsingel, Rotterdam, Netherlands, a subject of the Queen of the Netherlands, have invented certain new and useful Improvements in Devices for Sharpening the Rotary Circular Knives of Meat-Slicing Machines, of which the following is a specification.

This invention relates to devices for sharpening the rotary circular knives of meat slicing machines.

The present invention is a development of or improvement upon my Patent No. 916,229, dated March 23, 1909.

In my prior invention aforesaid I described a device comprising a movable support with two sharpeners thereon one for the back and one for the face of the knife, the sharpener for the back being arranged at an angle to the knife edge and the sharpener for the face being arranged in line therewith. By vertically adjusting the support the sharpeners could be moved into and out of engagement with the knife. Under my present invention I provide a device having means whereby both sharpeners can be simultaneously moved into engagement with the knife or away therefrom by the simple movement of a handle which operates a cam or its equivalent. It is not necessary, in order to do this, to shift the support carrying the sharpeners.

In order that the invention may be clearly understood I have hereunto appended explanatory drawings, whereon:—

Figure 1:
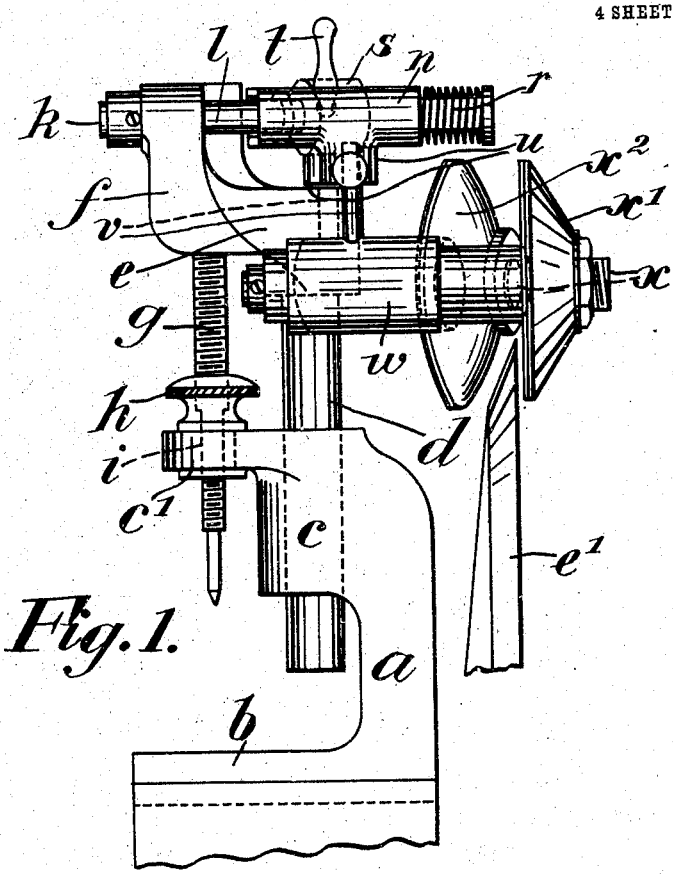
Figure 2:
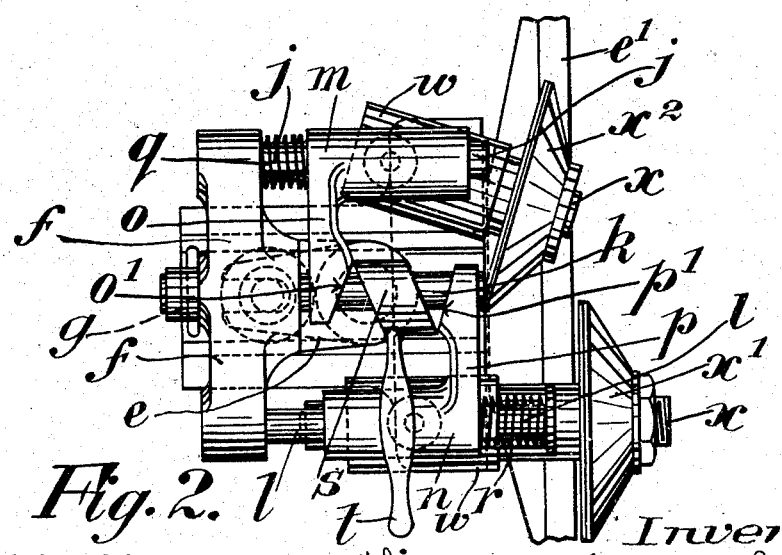
Figure 5:
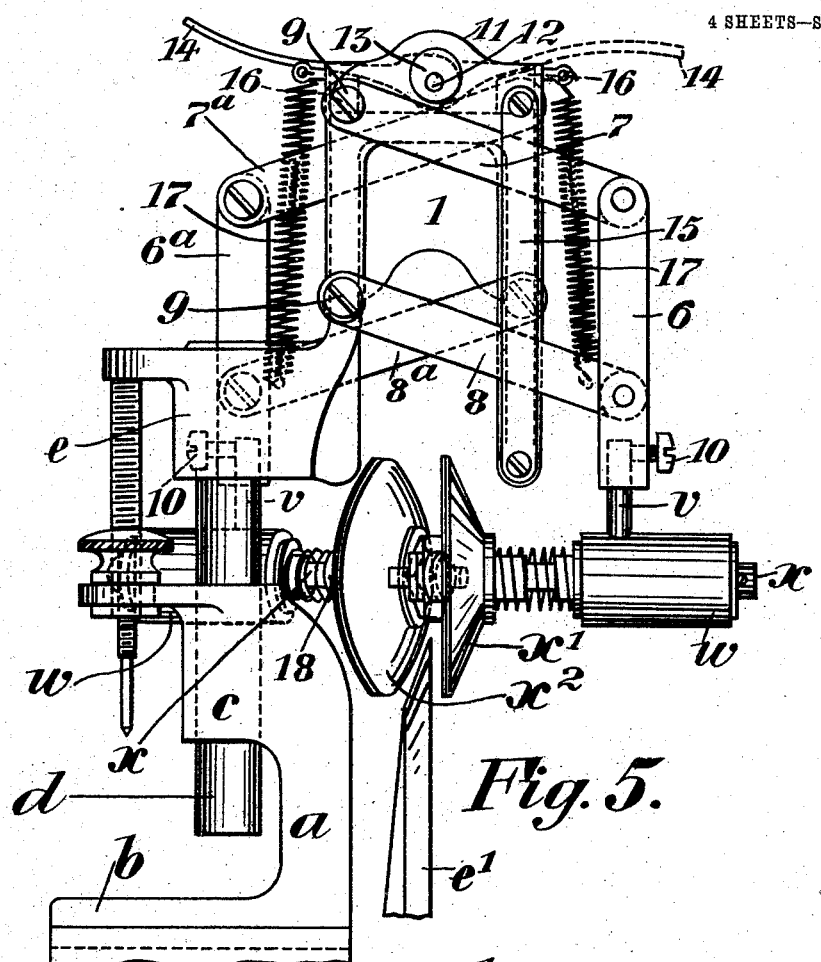

Figure 1 is a side view of one form of the improved sharpening device and showing the sharpeners out of engagement with the knife $e^1$. Fig. 2 is a plan view of the same. Fig. 3 is a front view. Fig. 4 is a plan of the sharpening device illustrated at Fig. 1, but showing the sharpeners in engagement with the knife $e^1$. Fig. 5 is a side view of a modified form of the sharpening device while Fig. 6 is a plan and Fig. 7 a front view of the same.

The same reference letters and numerals wherever repeated indicate the same parts.

In carrying out my invention, according to the arrangement shown at Figs. 1 to 4 inclusive, I, preferably, make the device with a removable bracket $a$ provided with a base $b$ and a socket $c$, the latter having a laterally projecting forked arm $c^1$. Adjustably carried in the socket $c$ is an upright and removable spindle $d$ having at its upper end a horizontally disposed bracket or support $e$ provided with a vertical extension $f$. Secured to the under face of the bracket $e$, and immediately behind the spindle $d$, is a downwardly projecting screw pin $g$, provided with a milled nut $h$ having a groove $i$ which engages the forked arm $c^1$. The vertical extension $f$ of the bracket $e$ is adapted to support and retain three horizontal pins $j$, $k$, and $l$. Slidably fitted on the fixed pins $j$, $l$, are sleeves $m$, $n$, having forked arms $o$, $p$, adapted to engage or partially embrace the central pin $k$. The forked-arms $o$, $p$, have beveled or inclined faces $o^1$, $p^1$, and are capable of being displaced laterally and in opposite directions on their respective spindles $j$, $l$, and against the action of the springs $q$, $r$, by the action of the double face-cam $s$ which is rigidly secured to the central and revoluble pin $k$ and is provided with an operating handle $t$. Depending from each of the sleeves $m$, $n$, is a projection $u$, having a hole therein. Into the hole in each projection $u$ is inserted, and adjustably secured, a short pin $v$ provided at its lower end with a ball bearing support $w$ adapted to carry a spindle $x$ on the outer end of which is secured a sharpening wheel or disk $x^1$. As will be seen the one spindle $x$ carries a sharpening wheel $x^1$ arranged parallel with the face of the knife $e^1$ while the other spindle $x$ is at an angle to the first one and carries a sharpening wheel $x^2$ at an angle to the edge of the knife and to the wheel $x^1$. The wheel $x^1$ acts on the face of the knife while the wheel $x^2$ acts on the back beveled edge thereof. The spiral spring $q$ on the pin $j$, acts on the sleeve $m$ while the spiral spring $r$, on the pin $l$, acts on the sleeve $n$. The normal position of the sharpeners $x^1$, $x^2$, would be out of engagement with the knife, as shown at Figs. 1 and 2, and they are so held out of engagement, against the action of the springs $q$, $r$, by means of the cam $s$ which is turned by the handle $t$, so as to force the arms of the sleeves away from one another thereby pushing the wheel $x^1$ away from the face of the knife and the wheel $x^2$ away from the back thereof, at the same time compressing the springs $q$, $r$. On turning the cam $s$ by the handle $t$, to the position shown at Fig. 4 the sleeves $m$, $n$, are moved, by the springs $q$, $r$, in opposite directions, on their pins, with the result that the wheel $x^1$ is pressed by its spring $r$ and the wheel $x^2$ by its spring $q$ against the knife so that, when the latter is rotated, it is ground and sharpened. It will, therefore, be seen that by the mere movement of the handle $t$ the sharpeners can be caused to engage with or to be disengaged from the knife. The sharpeners can be adjusted vertically to suit the knife by manipulating the nut $h$ which, being swivelly held by the forked arm $c^1$, when turned, raises or lowers the screw $g$ and support $f$.

Figure 6:
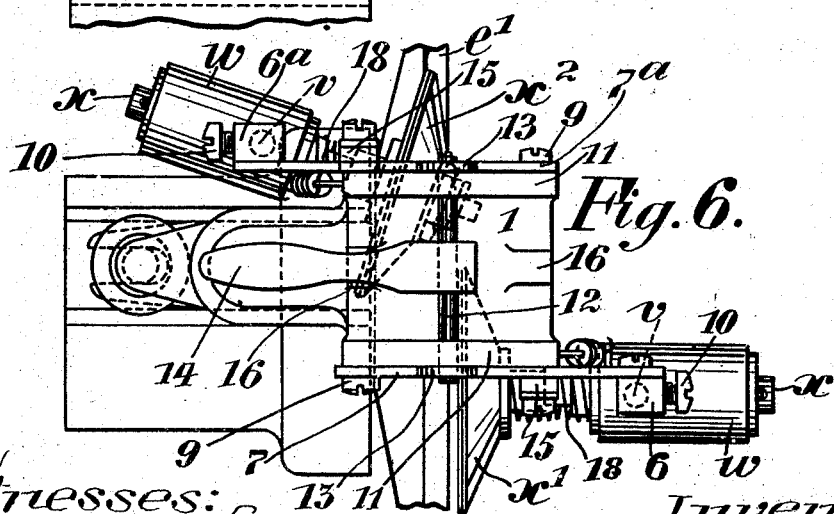

In the modified arrangement shown at Figs. 5, 6, and 7 the sharpeners $x^1$, $x^2$, are positively moved into engagement with the knife through parallel arrangements of links acted on by two cams and are moved out of engagement by springs. In this case the pillar $d$ carries a bracket $e$ with an upwardly extending and rectangularly shaped block 1 which is provided, on each side with a parallel and duplicate arrangement of links marked 6, 7, 8, on the one side and $6^a$, $7^a$, $8^a$, on the other side, the end members 6, $6^a$ of which are adapted to carry the spindles $x$, $x$, of the sharpeners $x^1$, $x^2$. Preferably the links or members 7, $7^a$, 8, $8^a$, are pivotally secured at their ends 9 to the block 1 and at their opposite ends are pin jointed, respectively, to the bars 6, $6^a$, each bar having at its lower end a pinching pin 10 and a hole for the reception of the pins $v$ of the ball bearing supports $w$, $w$, of the wheels $x^1$, $x^2$. As will be seen the one support $w$ is at one side of the knife and the other at the opposite side, the links being adapted to act from opposite sides of the block 1. The upper side of said block has two upwardly projecting pieces 11, 11, through which passes a short shaft 12 having, at each end thereof, a cam 13 which shaft, on being turned by means of the handle 14 secured thereto, causes the said cams to bear against the upper members 7, $7^a$ of the parallel link arrangements and thereby force the emery wheels downward and inward into engagement with the circular knife $e^1$. When it is desired to take the wheels out of engagement with the knife the cams are turned in the reverse direction by the handle 14 rigidly attached to the shaft 12 whereupon the springs 17 automatically operate the link gears and pull the wheels away from the knife. The wheels are made adjustable on their spindles $x$ and are acted on by springs 18, 18, so as to keep them always up to their work. The links 7, $7^a$, 8 and $8^a$ are held in position and guided by means of guide bars 15, one secured at each side of the block 1. Stops 16 limit the movement of the handle 14.

The sharpeners employed may be of any suitable and well known kind.

Having now fully described my invention what I claim and desire to secure by Letters Patent is:—

1. The combination in a device for sharpening the rotary circular knives of meat slicing machines having a rotary sharpener adapted to act on the face of the knife, a rotary sharpener adapted to act on the back of the knife, and means for carrying the said sharpeners, of cam means for simultaneously moving the said sharpeners into engagement with the knife, and means for simultaneously moving them out of engagement therewith and away from one another.

2. A device for sharpening the rotary circular knives of meat slicing machines, comprising in combination, a rotatable sharpener adapted to act on the face of the knife, a rotatable sharpener adapted to act on the back of the knife, means for carrying the said sharpeners, means for simultaneously moving the said sharpeners toward one another and into engagement with the knife, and means for simultaneously and automatically moving both of the sharpeners out of engagement with the knife.

3. The combination in a device for sharpening the rotary circular knives of meat slicing machines of a rotatable sharpener adapted to act on the face of the knife, a rotatable sharpener adapted to act on the back of the knife, means for carrying the said sharpeners, spring means for simultaneously and uniformly moving both the said sharpeners toward one another and into engagement with the knife and means for simultaneously moving them out of engagement therewith and away from one another.

4. The combination in a device for sharpening the rotary circular knives of meat slicing machines of a rotary sharpener adapted to act on the face of the knife, a rotary sharpener adapted to act on the back of the knife, means for carrying the said sharpeners, means for simultaneously moving the said sharpeners into engagement with the knife, and cam means for simultaneously moving them out of engagement therewith.

5. A device for sharpening the rotary circular knives of meat slicing machines comprising, in combination, a movable sharpener adapted to act on the face of the knife and be rotated thereby, a movable sharpener adapted to act on the back of the knife and be rotated thereby, means for carrying the said sharpeners, a support, pins carried by the support, a movable sleeve connected to the one sharpener on one pin, a movable sleeve connected to the other sharpener on another pin, means for moving both sleeves simultaneously on their pins in one direction and means for moving both sleeves simultaneously in the opposite direction.

6. A device for sharpening the rotary circular knives of meat slicing machines, comprising, in combination, a movable sharpener adapted to act on the face of the knife, a movable sharpener adapted to act on the back of the knife, means for carrying the said sharpeners, a support, pins carried by the support, a movable sleeve connected to the one sharpener on one pin, a movable sleeve connected to the other sharpener on another pin, cam means for moving both sleeves simultaneously on their pins in one direction and spring means for moving both sleeves simultaneously in the opposite direction.

7. A device for sharpening the rotary circular knives of meat slicing machines, comprising, in combination, a movable sharpener adapted to act on the face of the knife, a movable sharpener adapted to act on the back of the knife, means for carrying the said sharpeners, a support, three pins carried by the support, a movable sleeve connected to the one sharpener on one pin, a movable sleeve connected to the other sharpener on another pin, a cam on the third pin, said cam being adapted to move both sleeves simultaneously on their pins in one direction and spring means for moving both sleeves simultaneously in the opposite direction.

8. A device for sharpening the rotary circular knives of meat slicing machines comprising, in combination, a movable sharpener adapted to act on the face of the knife, a movable sharpener adapted to act on the back of the knife, means for carrying the said sharpeners, a support, three pins carried by the support, a movable sleeve having a forked arm connected to the one sharpener on one pin, a movable sleeve having a forked arm connected to the other sharpener on another pin, a cam on the third pin adapted to act on the said forked arms, means for moving the cam together with the sleeves and sharpeners in one direction and means for moving the sleeves and sharpeners in the opposite direction.

9. A device for sharpening the rotary circular knives of meat slicing machines, comprising, in combination, a sharpener adapted to act on the face of the knife, a sharpener adapted to act on the back of the knife, an adjustable support for said sharpeners, three laterally projecting pins in said support, a sleeve carrying the one sharpener movably fitted on one pin, a sleeve carrying the other sharpener movably fitted on a second pin, springs acting on said sleeves, laterally projecting arms on said sleeves, a cam on the third pin and adapted to act on said arms, a handle on the cam, and springs adapted to act on said sleeves and press the sharpeners against the knife.

10. A device for sharpening the rotary circular knives of meat slicing machines, comprising, in combination, a sharpener adapted to act on the face of the knife, a sharpener adapted to act on the back of the knife, an adjustable support for said sharpeners, three laterally projecting pins in said support, a sleeve carrying the one sharpener movably fitted on one pin, a sleeve carrying the other sharpener movably fitted on a second pin, laterally projecting arms with inclined ends on said sleeves, a cam with two inclined faces on the third pin and adapted to act on said arms, a handle on the cam, and springs adapted to act on said sleeves and press the sharpeners against the knife.

11. A device for sharpening the rotary circular knives of meat slicing machines, comprising, in combination, a sharpener adapted to act on the face of the knife, a sharpener adapted to act on the back of the knife, a bracket, a support adjustable vertically in the bracket by means of a screw, three laterally projecting pins in said support, a sleeve carrying the one sharpener movably fitted on one pin, a sleeve carrying the other sharpener movably fitted on a second pin, springs acting on said sleeves, laterally projecting arms on said sleeves, a cam on the third pin and adapted to act on said arm, a handle on the cam, and springs adapted to act on said sleeves and press the sharpeners against the knife.

12. A device for sharpening the rotary circular knives of meat slicing machines, comprising, in combination, a sharpener adapted to act on the face of the knife, a sharpener adapted to act on the back of the knife, means for carrying the said sharpeners, a cam when turned manually in one direction simultaneously moving the carrying means and therewith the sharpeners out of engagement with the knife and springs for automatically and simultaneously moving the carrying means and therewith the sharpeners into engagement with the knife whenever the cam is turned in the opposite direction.

13. A device for sharpening the rotary circular knives of meat slicing machines, comprising, in combination, a bracket, a pillar slidably fitted in said bracket and having a support at its upper end, means for adjusting said pillar in said bracket, laterally disposed and fixed pins in said support, a third and movable pin intermediate thereof, sleeves on said fixed pins, springs, a cam on said intermediate pin, means for turning said cam, lateral arms on said sleeves engaging said cam, ball bearing supports depending from said sleeves, a spindle in each ball bearing support, and a rotary sharpener on each spindle the one sharpener being adapted to act on one side of the knife and the other on the opposite side thereof.

In testimony whereof I affix my signature in presence of two witnesses.

WILHELMUS ADRIANUS VAN BERKEL.

Witnesses:
ADOLF ARIS KLEIN,
FREDERIKUS ADRIANUS HENDRIKUS STAM.